United States Patent
Pader

[15] 3,689,637
[45] Sept. 5, 1972

[54] DENTIFRICE COMPOSITION

[72] Inventor: Morton Pader, West Englewood, N.J.

[73] Assignee: Lever Brothers Company, New York, N.Y.

[22] Filed: July 11, 1969

[21] Appl. No.: 841,156

[52] U.S. Cl. .................................................. 424/52
[51] Int. Cl. ............................................... A61k 7/16
[58] Field of Search ............................... 424/49–58

[56] References Cited

UNITED STATES PATENTS 3,538,230  11/1970  Pader et al. ................... 424/50
3,250,680  5/1966  Menkart et al. ............. 424/57

OTHER PUBLICATIONS

Trademark No. 818,419, Close- Up, to Lever Brothers Co., Nov. 8, 1966.

*Primary Examiner*—Richard L. Huff
*Attorney*—Brumbaugh, Graves, Donohue & Raymond

[57] ABSTRACT

This disclosure is concerned with a dentifrice composition which has a high molecular weight polyethylene glycol, a silica xerogel and a silica aerogel and which is opaque, translucent or transparent.

9 Claims, No Drawings

DENTIFRICE COMPOSITION

An acceptable dentifrice used in conjunction with a toothbrush, removes from the teeth stains of various types, food debris, dental plaque, microorganisms and incompletely calcified supragingival calculus. An acceptable dentifrice also dislodges collections of food debris and accumulations of microorganisms from the interproximal spaces between teeth. An abrasive cleansing agent is usually included in the dentifrice to accomplish these results. However, the cleansing agent must not cause too much abrasion of the enamel surface of the teeth; it certainly must not scratch or otherwise damage the tooth when used in normal fashion.

It is, moreover, cosmetically desirable and attractive for a dentifrice, particularly a toothpaste, to have a short texture after it extrudes from a tube as a cohesive ribbon. In other words, the paste ribbon must not behave like taffy leaving a long string when the tube is drawn away from the toothbrush; this is frequently described as being "stringy". A dentifrice has short texture as defined herein if a paste ribbon breaks off relatively sharply on the toothbrush when the tube is drawn away.

Still another requirement of a dentifrice is that it disperse readily in the mouth after it has been applied with a toothbrush. It must not taste gummy during toothbrushing, and should leave the mouth feeling fresh and clean, but not coated. If a foaming agent, e.g., a detergent, is used, the foam preferably should be light and bubbly, rather than dense. The flavor of the dentifrice, if a flavor is added, should be released quickly from the dentifrice when the latter is introduced into the mouth and toothbrushing is commenced.

In some instances, moreover, it is desirable for a dentifrice to be translucent or transparent. Various proposals have been made heretofore (U.S. Pat. Nos. 2,820,000 and 2,975,102 and Belgian Pat. No. 586,645). In one proposal, a clear, jelly-like transparent dentifrice comprises a mixture of water-soluble acrylic resins as a swelling agent. These dentifrices, however, are free of any solid materials, such as particulate abrasives or tooth polishing agents. In view of the absence of these solid particulate materials, the cleansing ability of the dentifrices may not be acceptable.

In another proposal, a translucent dentifrice utilizes Cab-O-Sil, a colloidal synthetic silica having a submicron particle size and a very low bulk density. This silica is prepared in a hot gaseous environment (1100° C.) by the vapor phase hydrolysis of a silicon compound. However, due to the extremely low particle size of the silica, the dentifrice has poor cleansing ability.

In still another proposal, diatomaceous silica is utilized as the polishing agent in a dentifrice composition. Such a silica, however, is of natural, rather than synthetic, origin and hence is deficient in many respects. For example, it lacks the purity required to maintain certain oral health ingredients in an "available" condition, i.e., impurities may react with an oral health agent such as a fluoride compound to render it inactive or less active. Impurities, such as $Fe_2O_3$, may also cause undesirable color changes upon storage. Moreover, diatomaceous silicas are too abrasive to the enamel surface.

The ability of a toothpaste to fulfill the textural, appearance and use properties described above will obviously be determined by the components thereof. Cleansing is achieved by the presence of a safe abrasive material in adequate concentration. Moistness and satisfying mouthfeel are provided by the incorporation of humectant materials, which also carry flavor. Foaming is provided by the use of a detergent material or soap. All of the ingredients are maintained as a cohesive, extrudable mass by a mucilaginous binder. Translucency or transparency can be obtained only when all of these factors are properly chosen, as shown herebelow.

Almost all of the conventional toothpastes now being marketed contain as abrasive a particulate calcium carbonate, dicalcium phosphate, calcium pyrophosphate, or insoluble sodium metaphosphate. The abrasive level generally is over about 35–40 percent. The humectant material is generally glycerine or sorbitol or another polyhydric alcohol, alone or in combinations. Water is also usually present. At the abrasive/liquid ratio prevailing in these toothpastes, any of a large number of mucilaginous binders can be used without adversely effecting texture, i.e., the toothpaste will be short in texture, not stringy. Some of the binders currently favored are sodium carboxymethyl-cellulose, Irish moss extract, and hydroxyethylcellulose. These binders, of carbohydrate origin, are suitable only at adequately high abrasive/liquid ratios; if the abrasive level is low, e.g., 10–15 percent abrasive, these binders give toothpaste with stringy texture. Also, so much binder might have to be used in low abrasive content toothpaste to make it thick and extrudable that the toothpaste would be gummy and unpleasant in the mouth.

The more common dentifrice abrasives listed above cannot be formulated to provide a transparent or translucent dentifrice with acceptable cleansing and textural properties, and good organoleptic quality.

It has now been discovered that a dentifrice can be provided that cleans without undue abrasion, that has a short texture, that has excellent organoleptic quality, and that has the desired degree of transparency. Thus, in accordance with one embodiment of this invention, a dentifrice is formed containing (1) a silica xerogel, (2) a silica aerogel, a pyrogenic silica or mixtures thereof, (3) a high molecular weight polyethylene glycol and (4) a humectant.

As defined hereafter, silica xerogel is exclusive of crystalline silicas three-dimensional networks other amorphous silicas, such as diatomaceous silica, silica sol (or colloidal silica), precipitated silica, pyrogenic silica and silica aerogel. Amorphous silica, including silica gels, nonporous precipitates, and pyrogenic materials can be considered polycondensation products of orthosilicic acid, $Si(OH)_4$. The physical structure of amorphous silica is represented by a system of polycondensation units or primary particles, the size and packing of which determine the exact geometry of the structure. This structure, as defined by surface area, pore volume and pore size, depends on the size and degree of packing of the elementary or ultimate particles; the latter consist of dimensional networks of $SiO_4$ tetrahedra. The only difference between gels and precipitates is the degree and strength of packing in the silica aggregates.

Silica gels have been disclosed as being suitable for various compositions (U.S. Pat. No. 3,250,680 and Swiss Pat. No. 280,671). However, the term "silica gel" encompasses a very broad spectrum of materials with identical chemical composition but widely varying physical properties. Depending on the method of manufacture, a silica gel can be tightly packed or porous, on the order of Angstrom units or microns or larger in particle size, regular or irregular in particle shape, mechanically weak or mechanically strong, agglomerated or in the form of individual particles, hydrated or anhydrous, reversibly or irreversibly dehydrated (if dehydrated), and with more or less surface silanol groups.

The silica xerogel used in this invention is defined herein as a synthetic, aggregated, amorphous, highly porous silica having an average particle diameter of between about two and 20 microns, preferably about 4 to 15 microns. These xerogels are known in the art [The Colloid Chemistry of Silica and Silicates, Iler, pages 127–180, Cornell University press (1955)]. The silica xerogel of the invention generally has a surface area of at least 300, preferably 600–1000, square meters per gram as determined by nitrogen adsorption. Because of the particular structure of the xerogel, which includes a high degree of porosity, it has an extremely high cleaning ability without harmfully abrading the tooth enamel surface as do nonporous silicas of comparable particle diameter. It imparts unusually high luster values to dental enamel. The dentifrice generally has about 5 percent to 50 percent of a silica xerogel.

The aforementioned silica xerogel may be prepared by the addition of a mineral acid, e.g., sulfuric acid, to a sodium silicate solution. A hydrosol is then formed which is allowed to gel to a hydrogel. The hydrogel consists of a three-dimensional network of polymerized silica units. The bonds in the network are formed by hydrogen bonding as well as siloxane bonds resulting from condensation between surface silanol groups. Several different types of silica gels are obtained depending on the rate of drying or, generally, the type of water displacement in the hydrogel. In the preparation of the preferred xerogels of this invention, the initial hydrogel is slowly washed and dried keeping the pH during this operation at about 4. During the relatively slow drying step, a strong shrinkage of the network structure occurs reducing the average pore diameter substantially. This porous structure is the reason for the large surface area of the xerogel, e.g., 300–1000 m²/g., substantially all due to internal surface area. The small size of the pores also contributes to the overall rigidity of xerogel particles making them ideal abrasive particles.

Suitable specific silica xerogels for this invention, among others, have an average particle diameter of about four or 10 microns and they are manufactured by Grace, Davison Chemical Co. under the tradenames Syloid 65 and Syloid 63, respectively. These products, among others, are described in "The Davison Family of Syloid Silicas" published by Grace, Davison Chemical Co. which is incorporated herein by reference.

It is preferred in the present invention to employ in conjunction with the silica xerogel a silica aerogel having an average particle diameter of below about four microns, e.g., one to three microns. The aerogel helps to body the toothpaste, but contributes minimally to abrasion. The silica aerogels which are also known in the art.

The Colloid Chemistry of Silica and Silicates, are obtained by washing the original hydrogel heretofore described but the water is removed instantly to avoid shrinkage of the gel. Due to the large pore diameter, the bonds between the ultimate particles are less rigid thus facilitating a breakdown of the agglomerate particles into smaller submicron units. The surface area of aerogels is usually below about 300, e.g., 200, square meters per gram, practically all of which is due to internal surface area. A suitable specific aerogel for this invention among others, has an average particle diameter of about three microns and it is manufactured by Grace, Davison Chemical Co. under the tradename Syloid 244. Generally, the dentifrice of the invention has about 0.5 percent to 20 percent of an aerogel silica.

A pyrogenic silica may be used in place of or in conjunction with the silica aerogel. The pyrogenic silicas are also well known in the art [Some Applications of Pyrogenic Silica in Cosmetic Chemistry, Donohue, American Perfumer, Dec. 1960, pages 49–52]. They are prepared from $SiCl_4$ by a vapor phase reaction. The pyrogenic silicas may occur with an average particle diameter of 15 millimicrons and the particle size may go as low as 10 millimicrons. An example of a suitable pyrogenic silica commercially available is Cab-O-Sil, sold in several variations by the Cabot Corporation.

The dentifrice of the present invention also contains as a binder and bodying agent at least one high molecular weight polyethylene glycol. Polyethylene glycol, which is well known in the art, has been used in various compositions (U.S. Pat. Nos. 2,501,145 and 3,228,844). As defined herein, however, a high molecular weight polyethylene glycol is a polymer of ethylene oxide with the generic formula $HOCH_2(CH_2O CH_2)_nCH_2OH$ where n represents the average number of oxyethylene groups to provide an average molecular weight of about 800 to 20,000, preferably 1,000 to 6,000. As further defined herein, a high molecular weight polyethylene glycol has a reduced viscosity of about 0.035 to 0.35 and this is determined as described in U.S. Pat. No. 2,991,229 which is incorporated herein by reference. The dentifrice usually has about 1 percent to 15 percent, preferably about 2 percent to 8 percent, of the high molecular weight polyethylene glycol.

A surprising feature of this invention is that the use of this relatively small amount of the high molecular weight polyethylene glycol has an extremely large beneficial effect upon the texture of the dentifrice and, when desired, upon the translucency and transparency.

Another surprising feature of the invention is that despite the high degree of cohesiveness provided by the polyethylene glycol, the toothpaste is very quickly dispersed in the mouth during toothbrushing. With binding and bodying agents usually used in toothpaste, an increase in amount of the agent is accompanied by an increase in the thickness or body, accompanied by a decrease in the rate at which the toothpaste disperses when it is contacted with water or saliva. This, surprisingly, is not true in the case of the high molecular weight polyethylene glycol when used in the silica dentifrice of this invention. Despite a very large increase in cohesiveness produced by the high molecular weight polyethylene glycol, the rate of dispersion in water is not affected markedly. As a corollary, it is possible by the use of the polyethylene glycol to attain a given degree of cohesiveness with a minimum amount of carbohydrate binder, e.g., sodium carboxymethylcellulose, which is desirable since carbohydrate binders adversely affect dispersibility in water (or saliva).

A humectant, generally about 40 percent to 85 percent, is included in the dentifrice. The suitable humectants for preventing hardness of a paste are well known in the art and include, among others, glycerol, sorbitol, propylene glycol and a polyethylene glycol with the generic formula as described above but with a low molecular weight, i.e., less than 800. A humectant frequently used is a 70 percent aqueous solution of sorbitol.

Water is an optional ingredient in the dentifrice and it may be used in an amount up to about 25 percent. In general, a transparent or translucent dentifrice has less water than an opaque dentifrice.

Up to about 2 percent of other binders known in the art may be optionally employed in the dentifrice. This includes those of natural and synthetic origin, such as, gum tragacanth, sodium carboxymethylcellulose, methylcellulose, hydroxyethylcellulose, propylene glycol alginate, Indian gum, Irish moss, carragheen, starch, acacia gums, agar agar, locust bean gum, pectin and the like.

The dentifrice of this invention may also contain up to about 15 percent of one or more other well known optional ingredients. Without limitation, these include the following: soaps and synthetic detergents, e.g., water-soluble alkyl and alkyl ether sulfates and sulfonates having alkyl groups with eight to 18 carbon atoms, water-soluble salts of sulfonated monoglycerides of fatty acids having from 10 to 18 carbon atoms, salts of fatty acid amides of taurines, such as sodium-N-methyl-N-palmitoyl tauride, salts of fatty acid esters of isethionic acid, and substantially saturated aliphatic acyl amides of saturated aliphatic monoamino carboxylic acids having 2 to six carbon atoms and in which the acyl radical contains 12 to 16 carbon atoms, such as sodium N-lauroyl sarcoside; flavoring agents, e.g., sweeteners and chloroform; oxygen releasers buffers; preservatives; and coloring materials. Another optional ingredient is one or more water-soluble ionizable fluorine-containing compounds. These compounds which are beneficial in the prevention of dental caries are well known in the art. The following, among others, are suitable: sodium fluoride, lithium fluoride, stannous fluoride, potassium fluoride, ammonium fluoride, sodium fluostannite, stannous chlorofluoride, sodium monofluophosphate and mixtures thereof. Optional ingredients may also be other therapeutic agents, such as germicides, antibiotics, astringents and mixtures thereof and this includes without limitation the following: tyrothrycin, chlorophyllins, hexachlorophene [2,2'-methylene-bis (3,4,6-trichlorophenol)], tribromosalicylanilide, polybromosalicylanilide, and astringent salts.

A dentifrice may be prepared from the aforementioned ingredients by any satisfactory method. Generally, a toothpaste is formed by blending the ingredients together after the polyethylene glycol is dispersed in the humectant. Deaeration is required for translucent or transparent dentifrices. High shearing action during deaeration maximizes the shortness of the texture resulting from the use of polyethylene glycol and allows maximum development of the thickening properties of polyethylene glycol.

As stated heretofore, the end product of this invention may be an opaque dentifrice. However, a translucent or transparent dentifrice is preferred. The type of dentifrice is determined from values which are derived from differences in reflectance with alternate use of white and black surfaces behind a 1.6 mm. cell in a General Electric Spectrophotometer with integrating sphere optics. an arbitrary index, TI, is defined as being equal to 1–AR where AR equals:

Absorbency with white backing/Absorbency with black backing measured at a wave length of 540 m$\mu$. The TI increases with increasing transparency. Dentifrices having a TI of 0 to about 0.5 are classified as being opaque for the purpose of this invention. Dentifrices having a TI of greater than about 0.5 up to about 0.8 are classified herein as translucent, while dentifrices having a TI of greater than about 0.8 are classified herein as transparent.

Thus in accordance with the present invention, it is now possible to form an improved dentifrice having a short texture. Furthermore, the dentifrice of the invention when desired, can be translucent or transparent.

The examples included herebelow are submitted to illustrate but not to limit this invention. Unless otherwise stated, all parts and percentages in the specification, examples and claims are based on weight.

EXAMPLE I

A dentifrice was prepared from the following ingredients:

| Ingredients | % |
|---|---|
| Silica xerogel(a) | 14.000 |
| Silica aerogel(b) | 7.000 |
| Carboxymethylcellulose(c) | 0.300 |
| Saccharin | 0.200 |
| Sodium benzoate | 0.081 |
| Sorbitol (70% solution) | 67.833 |
| Dye solution | 0.536 |
| Polyethylene glycol(d) | 1.000 |
| Hexachlorophene | 0.050 |
| Flavor | 2.000 |
| Mixture of 21% sodium lauryl sulfate and 79% glycerin | 7.000 |
| Total | 100.000 |

(a)Syloid 63; 10 micron average particle size
(b)Syloid 244; 3 micron average particle size
(c)Medium viscosity; CMC 9M
(D)Average molecular weight of 6,000

This dentifrice was transparent, had an acceptable consistency and was very short in texture.

EXAMPLE II

For comparative purposes, a dentifrice was prepared from the same ingredients as described in Example I except that the polyethylene glycol was replaced with additional sorbitol. Although the dentifrice was translucent, it was stringy and had an unacceptable soft consistency.

EXAMPLE III

The following ingredients were used to prepare a dentifrice:

| Ingredients | % |
| --- | --- |
| Silica xerogel of Example I | 14.000 |
| Silica aerogel of Example I | 7.000 |
| Carboxymethylcellulose of Example I | 0.300 |
| Saccharin | 0.200 |
| Sodium benzoate | 0.081 |
| Sorbitol (70% solution) | 67.833 |
| Dye solution | 0.536 |
| Polyethylene glycol(a) | 1.000 |
| Hexachlorophene | 0.050 |
| Flavor | 2.000 |
| Mixture of 21% sodium lauryl sulfate and 79% glycerin | 7.000 |
| Total | 100.000 |

(a) Average molecular weight of 1,000

The dentifrice of this example was transparent, had an acceptable consistency and was very short in texture.

EXAMPLE IV

A dentifrice was prepared from the ingredients as follows:

| Ingredients | % |
| --- | --- |
| Silica xerogel of Example I | 14.000 |
| Silica aerogel of Example I | 7.000 |
| Carboxymethylcellulose(a) | 0.300 |
| Saccharin | 0.200 |
| Sodium benzoate | 0.081 |
| Sorbitol (70% solution) | 65.833 |
| Dye solution | 0.536 |
| Polyethylene glycol(b) | 3.000 |
| Hexachlorophene | 0.050 |
| Flavor | 2.000 |
| Mixture of 21% sodium lauryl sulfate and 79% glycerin | 7.000 |
| Total | 100.000 |

(a) Medium viscosity; CMC 9M31XF
(b) Average molecular weight of 20,000

A transparent dentifrice was provided which had a short texture and an acceptable consistency.

EXAMPLE V

The following ingredients were employed to provide a dentifrice:

| Ingredients | % |
| --- | --- |
| Silica xerogel of Example I | 14.000 |
| Silica aerogel of Example I | 8.000 |
| Carboxymethylcellulose of Example IV | 0.300 |
| Saccharin | 0.200 |
| Sodium benzoate | 0.081 |
| Sorbitol (70% solution) | 47.498 |
| Glycerin | 15.335 |
| Dye solution | 0.536 |
| Polyethylene glycol(a) | 5.000 |
| Hexachlorophene | 0.050 |
| Flavor | 2.000 |
| Mixture of 21% sodium lauryl sulfate and 79% glycerin | 7.000 |
| Total | 100.000 |

(a) Average molecular weight of 1,540

This dentifrice was transparent, had a good consistency and a very short texture.

EXAMPLE VI

A dentifrice was prepared from the following ingredients:

| Ingredients | % |
| --- | --- |
| Silica xerogel of Example I | 14.000 |
| Silica aerogel of Example I | 8.000 |
| Carboxymethylcellulose of Example IV | 0.300 |
| Saccharin | 0.200 |
| Sodium benzoate | 0.081 |
| Sorbitol (70% solution) | 47.498 |
| Glycerin | 15.335 |
| Dye solution | 0.536 |
| Polyethylene glycol(a) | 5.000 |
| Hexachlorophene | 0.050 |
| Flavor | 2.000 |
| Mixture of 21% sodium lauryl sulfate and 79% glycerin | 7.000 |
| Total | 100.000 |

(a) Average molecular weight of 4,000

The dentifrice provided in this example was transparent, had an extremely short texture and a good consistency.

EXAMPLE VII

A dentifrice was formed from the ingredients as follows:

| Ingredients | % |
| --- | --- |
| Silica xerogel of Example I | 14.000 |
| Silica aerogel of Example I | 7.000 |
| Carboxymethylcellulose of Example I | 0.300 |
| Saccharin | 0.200 |
| Sodium benzoate | 0.081 |
| Sorbitol (70% solution) | 58.833 |
| Dye solution | 0.536 |
| Polyethylene glycol of Example VI | 10.000 |
| Hexachlorophene | 0.050 |
| Flavor | 2.000 |
| Mixture of 21% sodium lauryl sulfate and 79% glycerin | 7.000 |
| Total | 100.000 |

This dentifrice was transparent, had a very short texture and good consistency.

EXAMPLE VIII

The ingredients listed herebelow were used to form a dentifrice:

| Ingredients | % |
| --- | --- |
| Silica xerogel of Example I | 14.000 |
| Silica aerogel of Example I | 7.000 |
| Carboxymethylcellulose of Example I | 0.300 |
| Saccharin | 0.200 |
| Sodium benzoate | 0.081 |
| Sorbitol (70% solution) | 41.300 |
| Glycerin | 12.533 |
| Dye solution | 0.536 |
| Polyethylene glycol of Example III | 15.000 |
| Hexachlorophene | 0.050 |
| Flavor | 2.000 |
| Mixture of 21% sodium lauryl sulfate and 79% glycerin | 7.000 |
| Total | 100.000 |

This dentifrice had a very short texture, an excellent consistency and was translucent.

EXAMPLE IX

A dentifrice was provided from the ingredients indicated herebelow:

| Ingredients | % |
| --- | --- |
| Silica xerogel of Example I | 14.000 |
| Silica aerogel of Example I | 7.000 |
| Carboxymethylcellulose of Example IV | 0.300 |
| Saccharin | 0.200 |
| Sodium benzoate | 0.081 |
| Sorbitol (70% solution) | 64.833 |
| Dye solution | 0.536 |
| Polyethylene glycol of Example III | 3.000 |
| Polyethylene glycol of Example I | 1.000 |
| Hexachlorophene | 0.050 |

Flavor 2.000
Mixture of 21% sodium lauryl
  sulfate and 79% glycerin 7.000
Total 100.000

A translucent dentifrice was formed which had a short texture and had an acceptable consistency.

EXAMPLE X

A dentifrice was formed from the following:

| Ingredients | % |
|---|---|
| Silica xerogel of Example I | 14.000 |
| Silica aerogel of Example I | 7.000 |
| Carboxymethylcellulose(a) | 0.300 |
| Saccharin | 0.200 |
| Sodium benzoate | 0.081 |
| Sorbitol (70% solution) | 55.067 |
| Glycerin | 8.766 |
| Dye solution | 0.536 |
| Polyethylene glycol of Example IV | 1.667 |
| Polyethylene glycol(b) | 3.333 |
| Hexachlorophene | 0.050 |
| Flavor | 2.000 |
| Mixture of 21% sodium lauryl sulfate and 79% glycerin | 7.000 |
| Total | 100.000 |

(a) Medium viscosity; CMC 9M 31 F
(b) Average molecular weight of 400

The resulting dentifrice was transparent, had a short texture and an acceptable consistency.

EXAMPLE XI

The following ingredients were used to prepare a dentifrice:

| Ingredients | % |
|---|---|
| Silica xerogel of Example I | 14.000 |
| Silica aerogel of Example I | 4.000 |
| Carboxymethylcellulose of Example IV | 0.300 |
| Carboxymethylcellulose(a) | 0.300 |
| Saccharin | 0.200 |
| Sodium benzoate | 0.081 |
| Sorbitol (70% solution) | 63.533 |
| Dye solution | 0.536 |
| Polyethylene glycol of Example IV | 2.667 |
| Polyethylene glycol of Example X | 5.333 |
| Hexachlorophene | 0.050 |
| Flavor | 2.000 |
| Mixture of 21% sodium lauryl Sulfate and 79% glycerin | 7.000 |
| Total | 100.000 |

(a) Medium viscosity; CMC 7MP

The dentifrice prepared in this example was transparent, had a short texture, and acceptable consistency.

EXAMPLE XII

A dentifrice was provided from the ingredients as follows:

| Ingredients | % |
|---|---|
| Silica xerogel of Example I | 14.000 |
| Silica aerogel of Example I | 8.000 |
| Saccharin | 0.200 |
| Sodium benzoate | 0.081 |
| Sorbitol (70% solution) | 47.698 |
| Glycerin | 15.435 |
| Dye solution | 0.536 |
| Polyethylene glycol of Example VI | 5.000 |
| Hexachlorophene | 0.050 |
| Flavor | 2.000 |
| Mixture of 21% sodium lauryl sulfate and 79% glycerin | 7.000 |
| Total | 100.000 |

This dentifrice was translucent, had a very short texture and good consistency.

EXAMPLE XIII

A dentifrice was made with the following composition:

| Ingredients | % |
|---|---|
| Silica xerogel of Example I | 18.000 |
| Pyrogenic silica(a) | 4.000 |
| Polyethylene glycol of Example V | 5.000 |
| Carboxymethyl cellulose of Example IV | 0.300 |
| Sorbitol (70% solution) | 47.448 |
| Glycerin | 15.335 |
| Dye solution | 0.536 |
| Saccharin | 0.200 |
| Sodium benzoate | 0.081 |
| Hexachlorophene | 0.050 |
| Flavor | 2.050 |
| Mixture of 21% sodium lauryl sulfate and 79% glycerin | 7.000 |
| Total | 100.000 |

(a) Cab-O-Sil M-5

This dentifrice was transparent, and had a very short texture and a good consistency.

EXAMPLE XIV

For comparative purposes, a dentifrice was formed from the following:

| Ingredients | % |
|---|---|
| Silica xerogel of Example I | 14.000 |
| Carboxymethylcellulose of Example IV | 0.600 |
| Saccharin | 0.200 |
| Sodium benzoate | 0.081 |
| Sorbitol (70% solution) | 63.533 |
| Dye solution | 0.536 |
| Polyethylene glycol of Example IV | 4.000 |
| Polyethylene glycol of Example X | 8.000 |
| Hexachlorophene | 0.050 |
| Flavor | 2.000 |
| Mixture of 21% sodium lauryl sulfate and 79% glycerin | 7.000 |
| Total | 100.000 |

Although this dentifrice was translucent, it had a poor consistency and a stringy texture. Example XIV demonstrates the criticality of having a material such as a silica aerogel (or pyrogenic silica) present in conjunction with a silica xerogel.

EXAMPLE XV

The following comparative dentifrice was also formed:

| Ingredients | % |
|---|---|
| Silica xerogel of Example I | 14.000 |
| Silica aerogel of Example I | 7.500 |
| Carboxymethyl cellulose(a) | 0.300 |
| Carboxymethyl cellulose of Example X | 0.300 |
| Saccharin | 0.200 |
| Sodium benzoate | 0.081 |
| Sorbitol (70% solution) | 67.916 |
| Dye solution | 0.536 |
| Flavor | 2.000 |
| Germicide | 0.100 |
| Mixture of 21% sodium lauryl sulfate and 79% glycerin | 7.000 |
| NaOH (30% solution) | 0.067 |
| Total | 100.000 |

(a) CMC 7MP

When this dentifrice was extruded from a toothpaste tube, the ribbon was stringy.

EXAMPLE XVI

A dentifrice identical to the one described in Example XV was prepared, except that 67.916 percent sorbitol solution was replaced with a combination of 54.333 percent sorbitol solution plus 13.583 percent glycerin. The ribbon was also stringy when the dentifrice was extruded from a toothpaste tube.

Examples XV and XVI show the criticality in having a high molecular weight polyethylene glycol in the dentifrice.

EXAMPLE XVII

The unusual utility of incorporating the polyethylene glycols of the invention into dentifrices was further demonstrated by making the following comparisons:

| Product | Typical Cohesion Value | Typical Dispersibility minutes |
|---|---|---|
| Dentifrice of Example III | 220 grams | 4¼ minutes |
| Dentifrice of Example V | 225 grams | 4¼ minutes |
| Dentifrice of Example XV | 90 grams | 5½ minutes |
| Dentifrice of Example XVI | 140 grams | 5¾ minutes |
| Pepsodent(a) | 120 grams | 5 minutes |
| Super Stripe(b) | 140 grams | 6 minutes |

(a) A commercial dicalcium phosphate toothpaste
(b) A commercial insoluble sodium metaphosphate toothpaste The dispersibility test measures the rate at which a dentifrice can be completely dispersed by water. Two ribbons of paste of given length and diameter are placed on a wire screen. Water is directed onto the ribbons under standard pressure from a given nozzle. The length of time required for the paste to be washed through the screen is determined. Values are relative; pastes are compared employing exactly the same screen, water pressure, and other conditions for each paste.

The cohesion value is a measure of the cohesive forces acting within a paste. The cohesion tester consists of two horizontal brass discs 1 ⅜ inch in diameter, one above the other separated by a distance of ⅛ inch. The space between the plates is filled with the paste; air pockets are carefully excluded. The upper disc is drawn upward from the lower one by means of a motor driving through a torque limiter to a rack and pinion device to exert a constant upward pull on the disc. The paste adheres to the two plates, and is drawn apart. A scale, measured in grams, is used to measure the force required to completely separate the sample of paste. A high cohesion paste is generally characterized by a strong, firm ribbon.

It may be seen from the above table that dentifrices of the invention were very cohesive and firm and they also dispersed in water very quickly.

Having set forth the general nature and specific embodiments of the present invention, the true scope is now particularly pointed out in the appended claims.

What is claimed is:

1. A dentifrice composition comprising (1) about 1 percent to 15 percent of a high molecular weight polyethylene glycol which is a polymer of ethylene oxide with the generic formula $HOCH_2(CH_2OCH_2)_nCH_2OH$ where n represents the average number of oxyethylene groups to provide an average molecular weight of about 800 to 20,000; (2) about 5 percent to 50 percent of a silica xerogel having an average particle diameter of between about two and 20 microns; (3) about 0.5 percent to 20 percent of a silica aerogel, a pyrogenic silica or mixtures thereof; and (4) a humectant.

2. The composition according to claim 1 which has a silica aerogel.

3. The composition according to claim 1 which has a pyrogenic silica.

4. The composition according to claim 1 in which the silica xerogel has an average particle diameter of about 10 microns.

5. The composition according to claim 1 in which the silica aerogel has an average particle diameter of about three microns.

6. The composition according to claim 1 in which the dentifrice is a transparent toothpaste having a TI of greater than about 0.8.

7. The composition according to claim 1 in which the dentifrice is a translucent toothpaste having a TI of greater than about 0.5 and up to about 0.8.

8. The composition according to claim 1 in which the molecular weight of the polyethylene glycol is about 1,000 to 6,000.

9. The composition according to claim 1 which further contains up to about 15 percent of a dentally acceptable fluorine-containing compound selected from the group consisting of sodium fluoride, lithium fluoride, stannous fluoride, potassium fluoride, ammonium fluoride, sodium fluostannite, stannous chlorofluoride, sodium monofluophosphate and mixtures thereof.

* * * * *

UNITED STATES PATENT OFFICE
CERTIFICATE OF CORRECTION

PO-1050
(5/69)

Patent No. 3,689,637  Dated September 5, 1972

Inventor(s) Morton Pader

It is certified that error appears in the above-identified patent and that said Letters Patent are hereby corrected as shown below:

Column 2, line 51, "three-dimensional networks" should be --and--;
line 65, before "dimensional" insert --three--;

Column 4, lines 2 and 3, the period should be changed to a comma and line 3 should follow immediately after the comma;

Column 5, line 46, after "releasers" insert a semi-colon;

Column 6, line 12, "an" should be --An--;

Column 11, line 19, before "minutes" insert --4--.

Signed and sealed this 13th day of February 1973.

(SEAL)
Attest:

EDWARD M. FLETCHER, JR.
Attesting Officer

ROBERT GOTTSCHALK
Commissioner of Patents